United States Patent
Weight et al.

(10) Patent No.: US 9,881,009 B1
(45) Date of Patent: Jan. 30, 2018

(54) IDENTIFYING BOOK TITLE SETS

(75) Inventors: Christopher F. Weight, Seattle, WA (US); Andrew D. Birkett, Edinburgh (GB); Janna Hamaker, Issaquah, WA (US); Tom Killalea, Seattle, WA (US); Alexander William Robb Nelson, Stirling (GB)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 13/048,426

(22) Filed: Mar. 15, 2011

(51) Int. Cl.
  *G06F 17/30* (2006.01)
(52) U.S. Cl.
  CPC .. G06F 17/30011 (2013.01); *G06F 17/30067* (2013.01)
(58) Field of Classification Search
  CPC ............... G06F 17/30; G06F 17/30722; G06F 17/30864; G06F 17/30911; Y10S 707/99933
  USPC .......... 434/317; 705/26.1, 51; 707/638, 769; 715/205, 250, 273; 725/60
  See application file for complete search history.

(56) References Cited

U.S. PATENT DOCUMENTS

| | | | |
|---|---|---|---|
| 4,884,974 A | 12/1989 | DeSmet | |
| 5,166,664 A | 11/1992 | Fish | |
| 5,802,204 A | 9/1998 | Basehore | |
| 5,907,845 A * | 5/1999 | Cox et al. | |
| 5,960,464 A | 9/1999 | Lam | |
| 5,986,690 A * | 11/1999 | Hendricks | 725/60 |
| 6,047,093 A | 4/2000 | Lopresti et al. | |
| 6,074,093 A | 6/2000 | Anderson | |
| 6,108,688 A | 8/2000 | Nielsen | |
| 6,138,129 A | 10/2000 | Combs | |
| 6,173,251 B1 | 1/2001 | Ito et al. | |
| 6,218,982 B1 | 4/2001 | Shirai et al. | |
| 6,377,945 B1 | 4/2002 | Risvik | |
| 6,622,624 B1 | 9/2003 | Divine et al. | |
| 6,658,626 B1 | 12/2003 | Aiken | |
| 6,704,733 B2 * | 3/2004 | Clark et al. | 705/26.1 |
| 6,741,985 B2 | 5/2004 | Green | |
| 6,898,307 B1 | 5/2005 | Harrington | |
| 7,020,654 B1 * | 3/2006 | Najmi | G06F 17/30345 |
| 7,020,663 B2 * | 3/2006 | Hay et al. | 434/317 |
| 7,028,258 B1 | 4/2006 | Thacker et al. | |

(Continued)

FOREIGN PATENT DOCUMENTS

JP          2009205248 A        9/2009

OTHER PUBLICATIONS

Non-Final Office Action for U.S. Appl. No. 13/050,829, dated May 8, 2012, Janna Hamaker et al., "Aligning Content Items to Identify Differences", 20 pages.

(Continued)

*Primary Examiner* — Richemond Dorvil
*Assistant Examiner* — Mark Villena
(74) *Attorney, Agent, or Firm* — Lee & Hayes, PLLC (57) ABSTRACT

Techniques are described for identifying book title sets. The techniques may include a first-pass comparison with other books to identify other candidate title sets. A second-pass comparison may then be performed with respect to the candidate title sets. The first-pass comparison may be based on book metadata such as titles and authorship. The second-pass comparison may include a more comprehensive content comparison, such as comparing the body text of the books.

24 Claims, 4 Drawing Sheets

(56) References Cited

U.S. PATENT DOCUMENTS

| | | |
|---|---|---|
| 7,702,655 B1 | 4/2010 | Panelli et al. |
| 7,823,127 B2 | 10/2010 | Zeidman |
| 8,051,088 B1* | 11/2011 | Tibbetts .............. G06F 17/2785 704/7 |
| 8,250,065 B1 | 8/2012 | Chambers et al. |
| 8,266,115 B1* | 9/2012 | Park et al. .................... 707/692 |
| 8,280,640 B2 | 10/2012 | Levin et al. |
| 8,316,032 B1 | 11/2012 | Baluja |
| 8,463,790 B1* | 6/2013 | Joshi ................ G06F 17/30011 707/738 |
| 8,495,061 B1* | 7/2013 | Lifantsev .......... G06F 17/30722 707/713 |
| 8,510,312 B1* | 8/2013 | Thibaux et al. .............. 707/748 |
| 2002/0021838 A1 | 2/2002 | Richardson et al. |
| 2002/0049781 A1 | 4/2002 | Bengtson |
| 2002/0091584 A1* | 7/2002 | Clark et al. ..................... 705/26 |
| 2002/0107735 A1 | 8/2002 | Henkin et al. |
| 2002/0123994 A1* | 9/2002 | Schabes .............. G06F 17/3061 |
| 2003/0032010 A1 | 2/2003 | Selifonov et al. |
| 2003/0093427 A1 | 5/2003 | Hsu et al. |
| 2003/0103238 A1 | 6/2003 | MacLean et al. |
| 2004/0068471 A1* | 4/2004 | Kato ............................... 705/51 |
| 2004/0088165 A1 | 5/2004 | Okutani et al. |
| 2004/0194021 A1 | 9/2004 | Marshall et al. |
| 2004/0205540 A1* | 10/2004 | Vulpe et al. ................... 715/511 |
| 2004/0218205 A1 | 11/2004 | Irwin et al. |
| 2005/0060273 A1 | 3/2005 | Andersen et al. |
| 2005/0096938 A1* | 5/2005 | Slomkowski et al. ............. 705/1 |
| 2005/0097007 A1* | 5/2005 | Alger et al. ..................... 705/26 |
| 2005/0131932 A1* | 6/2005 | Weare ............................ 707/102 |
| 2005/0138551 A1 | 6/2005 | Elazar et al. |
| 2005/0160355 A1 | 7/2005 | Cragun et al. |
| 2005/0160356 A1 | 7/2005 | Albornoz et al. |
| 2005/0190397 A1 | 9/2005 | Ferlitsch |
| 2005/0192955 A1* | 9/2005 | Farrell ............................... 707/5 |
| 2005/0196074 A1 | 9/2005 | Deere |
| 2005/0198070 A1* | 9/2005 | Lowry ........................ 707/104.1 |
| 2005/0209989 A1 | 9/2005 | Albornoz et al. |
| 2006/0036593 A1 | 2/2006 | Dean et al. |
| 2006/0036934 A1* | 2/2006 | Fujiwara ........... G06F 17/30011 715/203 |
| 2006/0041590 A1* | 2/2006 | King ................ G06F 17/30011 |
| 2006/0150096 A1 | 7/2006 | Thacker et al. |
| 2006/0156226 A1 | 7/2006 | Dejean et al. |
| 2006/0173818 A1* | 8/2006 | Berstis et al. ...................... 707/3 |
| 2006/0262340 A1 | 11/2006 | Lee |
| 2006/0277167 A1 | 12/2006 | Gross et al. |
| 2006/0294094 A1* | 12/2006 | King .................... G06Q 20/12 |
| 2007/0061582 A1 | 3/2007 | Ohmori et al. |
| 2007/0150443 A1 | 6/2007 | Bergholz et al. |
| 2007/0196015 A1 | 8/2007 | Meunier et al. |
| 2007/0217692 A1 | 9/2007 | Newcomer et al. |
| 2007/0217715 A1 | 9/2007 | Newcomer et al. |
| 2007/0274704 A1 | 11/2007 | Nakajima et al. |
| 2007/0280072 A1 | 12/2007 | Hsieh et al. |
| 2007/0286465 A1 | 12/2007 | Takahashi et al. |
| 2008/0019430 A1 | 1/2008 | Suzuki et al. |
| 2008/0027916 A1* | 1/2008 | Asai .................. G06F 17/30625 |
| 2008/0077570 A1* | 3/2008 | Tang ................. G06F 17/30684 |
| 2008/0114757 A1 | 5/2008 | Dejean et al. |
| 2008/0126335 A1 | 5/2008 | Gandhi et al. |
| 2008/0134023 A1 | 6/2008 | Aizawa |
| 2008/0141117 A1* | 6/2008 | King ................ G06F 17/30011 715/238 |
| 2008/0154943 A1 | 6/2008 | Dreyer et al. |
| 2008/0163039 A1 | 7/2008 | Ryan et al. |
| 2008/0209314 A1 | 8/2008 | Sylthe et al. |
| 2008/0229182 A1* | 9/2008 | Hendricks et al. ........... 715/205 |
| 2008/0235579 A1 | 9/2008 | Champion et al. |
| 2008/0243842 A1* | 10/2008 | Liang ................ G06F 17/30011 |
| 2008/0275871 A1* | 11/2008 | Berstis et al. ...................... 707/5 |
| 2008/0294453 A1 | 11/2008 | Baird-Smith et al. |
| 2009/0012984 A1* | 1/2009 | Ravid et al. .................. 707/101 |
| 2009/0027419 A1 | 1/2009 | Kondo et al. |
| 2009/0049026 A1 | 2/2009 | Ohguro |
| 2009/0063557 A1 | 3/2009 | MacPherson |
| 2009/0144277 A1 | 6/2009 | Trutner et al. |
| 2009/0164312 A1 | 6/2009 | Nadig |
| 2009/0182728 A1 | 7/2009 | Anderson |
| 2009/0204893 A1 | 8/2009 | Nguyen et al. |
| 2009/0241054 A1 | 9/2009 | Hendricks |
| 2009/0254810 A1 | 10/2009 | Mitsui |
| 2009/0265321 A1 | 10/2009 | Grubb et al. |
| 2009/0310408 A1 | 12/2009 | Lee et al. |
| 2009/0313539 A1 | 12/2009 | Ota et al. |
| 2009/0324096 A1 | 12/2009 | Megawa |
| 2010/0114827 A1* | 5/2010 | Pearce .......................... 707/638 |
| 2010/0166309 A1 | 7/2010 | Hull et al. |
| 2010/0198864 A1* | 8/2010 | Ravid et al. .................. 707/769 |
| 2010/0205160 A1 | 8/2010 | Kumar et al. |
| 2010/0220216 A1 | 9/2010 | Fishman et al. |
| 2010/0251089 A1 | 9/2010 | Cole et al. |
| 2010/0262454 A1 | 10/2010 | Sommer et al. |
| 2011/0029491 A1* | 2/2011 | Joshi ................ G06F 17/30675 707/692 |
| 2011/0078152 A1 | 3/2011 | Forman et al. |
| 2011/0119240 A1 | 5/2011 | Shapira |
| 2011/0153330 A1 | 6/2011 | Yazdani et al. |
| 2011/0231474 A1 | 9/2011 | Locker et al. |
| 2012/0036431 A1* | 2/2012 | Ito et al. ........................ 715/273 |
| 2012/0060082 A1 | 3/2012 | Edala et al. |
| 2012/0121195 A1 | 5/2012 | Yadid et al. |
| 2012/0198330 A1 | 8/2012 | Koppel et al. |
| 2014/0298167 A1 | 10/2014 | Jones et al. |

OTHER PUBLICATIONS

Office action for U.S. Appl. No. 13/050,829, dated Nov. 29, 2012, Hamaker et al.,"Aligning Content Items to Identify Differences", 24 pages.
Office action for U.S. Appl. No. 12/979,971, dated Aug. 8, 2013, Jones et al., "Electronic Book Pagination", 32 pages.
Office action for U.S. Appl. No. 12/980,015, dated Sep. 10, 2013, Weight et al., "Book Version Mapping", 27 pages.
Wikipedia, "Lookuptable", at http://en.wikipedia.org/w/index.php?title=Lookup_table&oldid_333018082, retrieved on Aug. 12, 2013, 2009, 7 pages.
Wikipedia, "Metadata", at http://en.wikipedia.org/w/index.php?title=Metadata&oldid=333583065, retrieved on Aug. 2, 2013, 2009, 17 pages.
Office action for U.S. Appl. No. 12/979,971, dated Apr. 18, 2013, Jones et al., "Electronic Book Pagination", 30 pages.
Final Office Action for U.S. Appl. No. 12/980,015, dated May 9, 2014, Christopher F. Weight, "Book Version Mapping", 30 pages.
Office Action for U.S. Appl. No. 12/979,971, dated Dec. 6, 2013, Derek T. Jones, "Electronic Book Pagination", 13 pages.
Office action for U.S. Appl. No. 13/050,829, dated Sep. 30, 2014, Hamaker et al., "Aligning Content Items to Identify Differences", 30 pages.
Office Action for U.S. Appl. No. 12/980,015, dated Jul. 7, 2015, Christopher F. Weight, "Book Version Mapping", 32 pages.
Office Action for U.S. Appl. No. 12/980,015, dated Jan. 21, 2016, Weight et al., "Book Version Mapping", 40 pages.
Office action for U.S. Appl. No. 12/980,015, dated Nov. 17, 2016, Weight et al., "Book Version Mapping", 27 pages.
Office Action for U.S. Appl. No. 14/308,914 dated Jul. 14, 2017, Jones et al, "Electronic Book Pagination", 22 pages.
Office Action for U.S. Appl. No. 14/308,914 dated Mar. 6, 2017, Jones et al, "Electronic Book Pagination", 18 pages.
Final Office Action for U.S. Appl. No. 12/980,015, dated May 19, 2017, Christopher F. Weight, "Book Version Mapping", 30 pages.
"How do I use the Migrate Comments Command?", The Same Page, retrieved Feb. 17, 2017 from http://blogs.adobe.com/thesamepage/2009/05/how_do_i_use_the_migrate_comme.html, posted May 28, 2009, 2 pgs.

* cited by examiner

IDENTIFYING BOOK TITLE SETS

BACKGROUND

The electronic distribution and consumption of electronic books is changing the nature of publishing. Books can now be published and republished with very little expense. In many cases, books can be published by simply submitting them electronically to an electronic distribution service.

However, electronic distribution services face a challenge in organizing and indexing the many book submissions that are received. This challenge is complicated by the fact that various versions of the same book may often be submitted. This may happen where a publisher offers a book in different versions, revisions, or editions. For example, an initial book offering may be followed by a version containing corrections and revisions. As another example, a subsequent edition of a book may contain a special forward or other front/back matter. As yet another example, different publishers or sources may submit various versions of the same book, particularly where the book is in the public domain, or when publishing rights are held by different publishers in different jurisdictions.

Electronic book submissions may be accompanied by metadata such as title, authorship, and other information, and this information can sometimes be compared to determine whether two submissions are the same book. However, metadata such as this is not always definitive. Titles, for example, may not always be sufficient because they may not be entirely consistent from one version to another, and because different books may have similar titles. Furthermore, supplied metadata varies in its completeness and accuracy.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

A book title set is a set of book products that represent the same or a very similar literary work. For instance, the literary work "Moby Dick" may be offered as a number of different versions, from a number of different publishers and sources. Even though there may be various differences between the versions, including formatting, graphics, front-matter, back-matter, and so forth, the versions are all considered to be part of the same title set because they share generally the same or very similar body text. Written and audio versions of a book, for example, may be considered part of the same title set.

Book distributors may wish to identify title sets for various reasons. For example, distributors may want to group members of a title set for convenient viewing and selection by customers. As another example, an online distributor may wish to identify user comments, ratings, and reviews regarding one book, and to associate them with all members of the same title set.

This disclosure describes techniques that can be used to efficiently determine whether books are part of the same book title set. The described techniques utilize multiple comparisons for this purpose. A first-pass comparison compares the metadata of an individual book with the metadata of other books to determine likely matching candidates. For example, a simple first-pass comparison may compare the title of the book with the titles of other books, identifying any such other books having similar titles.

A second-pass comparison then compares the content of the book with the content of any identified candidates. If the body text is identical or very similar to that of another book, the two books are deemed to be part of the same title set.

Figure 1:
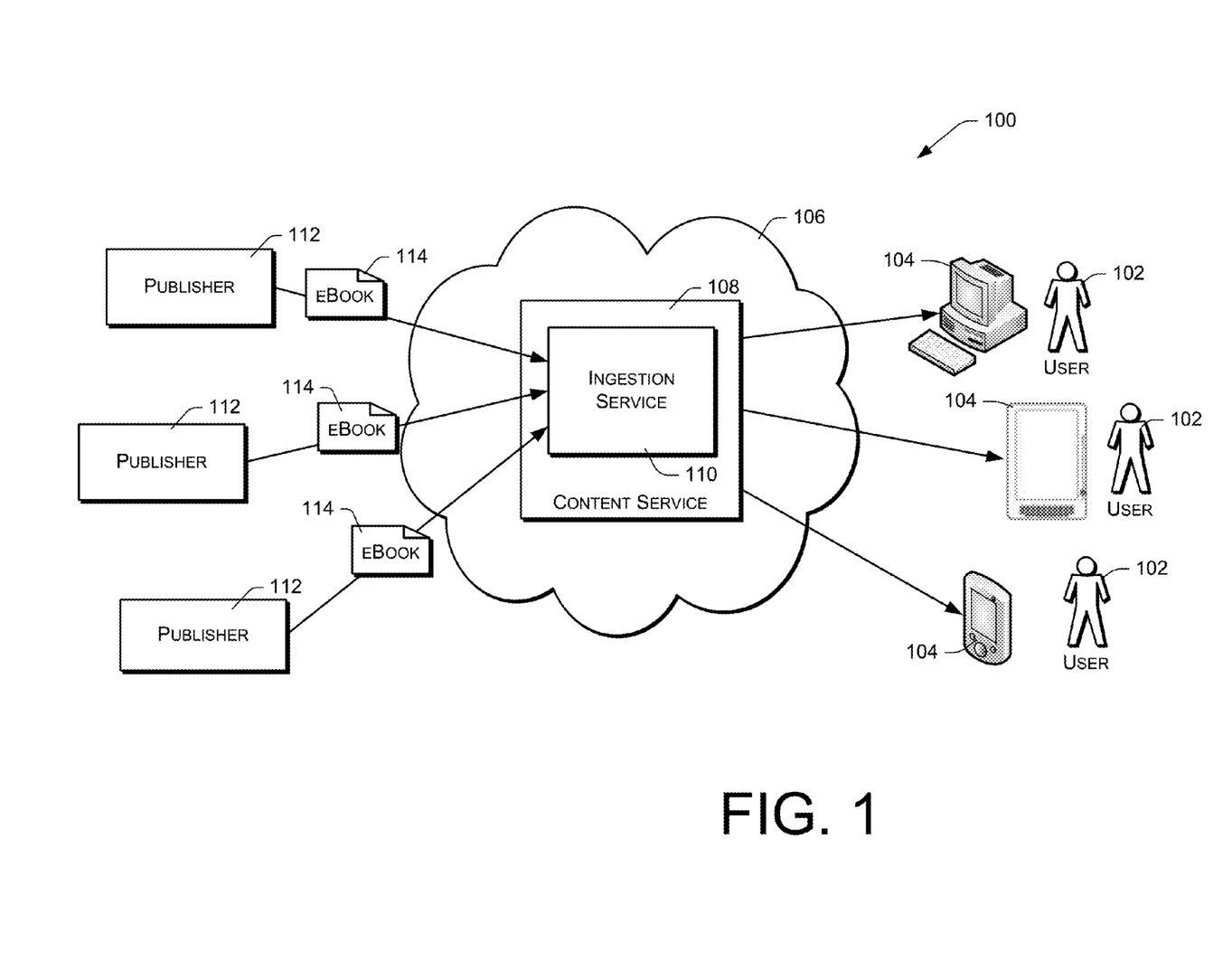
FIG. 1 is a block diagram illustrating an operational environment of a content service that implements techniques described herein for grouping electronic books with existing book title sets.

FIG. 1 shows an online environment 100 in which these techniques may be practiced. The online environment 100 includes a plurality of users 102, each of which has or is associated with an electronic book reader 104 (also referred to herein as an electronic reader). Although FIG. 1 illustrates three users 102 and book readers 104, the described techniques can of course be used with any number of users and electronic book readers. In addition, a single user 102 may use a plurality of electronic book readers 104.

Each electronic reader 104 has a display upon which electronic content such as electronic books (eBooks) may be rendered. The terms content, content item, and "eBook" include essentially any form of electronic data that may be consumed on a device, including textual and verbal works comprising sequences of words such as digital books, audio books (which may also include video), electronic magazines, papers, journals, periodicals, documents, instructional materials, course content, and so on.

The electronic readers 104 may comprise various types of devices, including computers, handheld devices or other types of small, light-weight, portable devices upon which eBooks and other content can be rendered and conveniently viewed in a manner similar to viewing a paper book. Examples of handheld electronic readers include flat form-factor devices such as tablets, pads, smartphones, personal digital assistants (PDAs), etc.

In some embodiments, the electronic readers 104 may comprise dedicated-purpose eBook reader devices, having flat-panel displays and other characteristics that mimic the look, feel, and experience offered by paper-based books. For example, such eBook reader devices may have high-contrast flat-panel displays that appear similar to a printed page and that persist without frequent refreshing. Such displays may consume very negligible amounts of power, so that the eBook reader devices may be used for long periods without recharging or replacing batteries. In some instances, these readers may employ electrophoretic displays.

In the example of FIG. 1, the electronic readers 104 have networking capabilities. For example, the electronic readers 104 may have wireless communication interfaces that allow communication though a network 106. The wireless communications interfaces may utilize WiFi, cellular, or other wireless data and networking technologies.

The network 106 may be any type of communication network, including a local-area network, a wide-area network, the Internet, a wireless network, a cable television network, a telephone network, a cellular communications network, combinations of the foregoing, etc. Services, sometimes referred to as "cloud-based" services, may be provided from the network 106. In FIG. 1, the network 106 is represented as a cloud, and network-based or cloud-based services relevant to this discussion are shown as blocks within the cloud.

In the configuration illustrated by FIG. 1, the electronic readers 104 may obtain content items from an online content or distribution service 108. The content service 108 may be accessed using the networking capabilities of the electronic readers 104. The content service 108 may be accessible through other means as well, such as by connection to intermediary devices like personal computers, different types of mobile devices, and so forth.

In FIG. 1, the content service 108 is illustrated as a network-based or cloud-based service, available over a public network such as the Internet. The electronic readers 104 may be configured to allow the users 102 to conveniently browse for content and content items from the content service 108, and to purchase and download selected content items from the content service 108.

The content service 108 might be implemented in some embodiments by an online merchant or vendor. Electronic books and other electronic content might be offered for sale by such an online merchant, or might be available to members or subscribers for some type of periodic or one-time fee. In some circumstances, eBooks or other content might be made available without charge. The content service 108 may include a virtual storefront or other type of online interface for interaction with consumers and/or devices. The content service 108 may expose a graphical, web-based user interface that can be accessed by human users to browse and obtain (e.g., purchase, rent, lease, etc.) content items such as eBooks. The content service may also expose programmatic interfaces or APIs (application program interfaces) that entities and devices can use to obtain digital content items and related services.

In the described embodiment, the content service 108 includes a content ingestion service 110. The content ingestion service 110 is a logical component to which publishers 112 can connect to submit electronic books 114 for publication and distribution via the content service 108. Most relevant to the discussion herein, the ingestion service 110 receives the eBooks 114 and compares them to the members of existing title sets to determine whether the submitted electronic books are or should be members of such existing title sets.

Note that the described comparisons may also be performed with respect to books that are already part of the publisher's library, rather than on books as they are newly received, in order to initially establish and identify title sets among previously submitted books.

Figure 2:
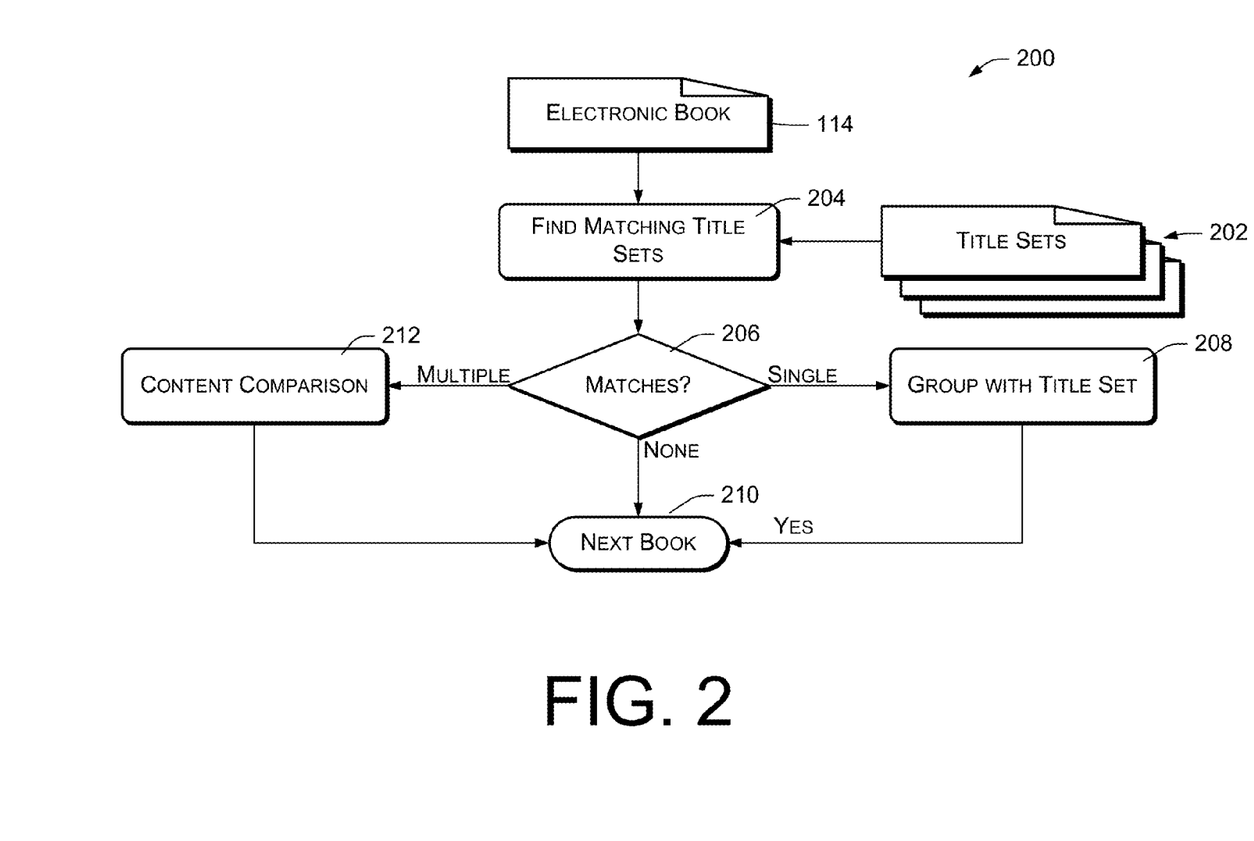
FIGS. 2 and 3 are flow diagrams illustrating example processes of analyzing electronic books to determine whether they should be grouped with existing title sets.
Figure 3:
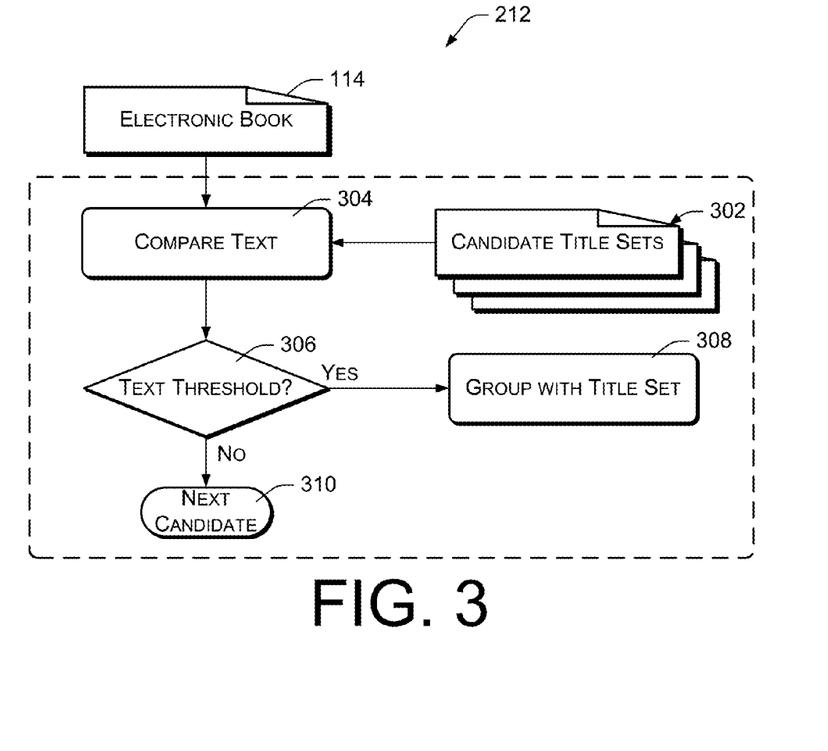

FIGS. 2 and 3 show details of this comparison. FIG. 2 shows actions associated with a first-pass comparison 200 that identifies one or more candidate title sets of which a received electronic book may be a member. This first-pass comparison is performed at a relatively high level, and can be accomplished with relatively less expense and processing (per title set) than the second-pass comparison. More specifically, in the described embodiment the first-pass comparison 200 comprises comparing the metadata of a received electronic book with the metadata of other, previously known title sets. If there is a single, unambiguous match between such metadata, the received book is added to the title set that produced this match. If the results of the first-pass comparison 200 are ambiguous, however, a second-pass comparison is performed.

FIG. 3 shows actions associated with a second-pass comparison 212, which is limited to candidate title sets identified in the first-pass comparison 200, and is performed if the first-pass comparison results in ambiguity—such as if the second-pass comparison identifies more than a single candidate title set. The second-pass comparison 212 can use more comprehensive and/or exhaustive comparison techniques because it involves a much smaller group of comparisons. More specifically, in the described embodiment the second-pass comparison 212 comprises comparing the body text of the received book with the body texts of each of the members of the candidate title sets (identified in the first-pass comparison 200) to determine whether the received electronic book is a member of any of the candidate title sets.

Referring now to FIG. 2, the ingestion service 110 receives the eBook 114 from one of the publishers 112 or some other source. Based on existing book title sets 202, an action 204 is performed, which comprises comparing the metadata of the electronic book 114 and the existing title sets 202.

The metadata comparison 204 may be performed in various ways, depending on the nature of available metadata. In general, metadata associated with received electronic books and with existing or previously catalogued books may include various data fields, including but not limited to title, authorship or author names, publisher name, publication data, copyright date, ISBN (International Standard Book Number), and so forth.

The metadata comparison 204 may comprise comparing one or more of the available metadata fields. For example, title and authorship may be compared.

In some cases, a metadata matching score may be calculated for each of the existing title sets. Such a metadata matching score may be based on the number of matching metadata fields, and may also be influenced by how closely individual fields match each other. Certain fields, such as title and authorship fields, may be normalized prior to comparison, by removing extraneous characters and converting to a single case (upper case or lower case).

In other cases, matching title sets may be found by simply submitting a query for existing title sets whose metadata matches the metadata of the electronic book 114. Such a query may return no matches, a single match, or multiple matches.

At 206, the ingestion service 110 determines whether action 204 found no matches, a single match, or multiple matches. If a single unambiguous match was found, an action 208 comprises adding the electronic book 114 to the existing title set whose metadata matched that of the electronic book 114. Execution then proceeds at 210 to the next electronic book 114—the actions of FIG. 2 are repeated for each newly incoming electronic book 114, or for each existing electronic book 114.

Multiple matches are identified at 206, indicating a plurality of existing title sets of which the electronic book 114 may be a member, a second-pass content comparison 212 is performed. This comparison will be described below, with reference to FIG. 3. Execution then proceeds at 210 to the next electronic book 114.

If no matches are identified at 206, execution simply proceeds at 210 to the next electronic book.

Note that in some embodiments, a title set may be represented by a normalized or canonical set of metadata. In these embodiments, the comparison of FIG. 2 may be performed against the canonical metadata of a title set, rather than to the metadata of every member of the title set. In other embodiments, the comparison of FIG. 2 may be limited to comparing the new electronic book 114 with a single member of each title set.

Also note that a title set may comprise only a single book or book version. In other words, a book that has no other versions may itself be treated as a title set, and the comparison of FIG. 2 will therefore include comparing the metadata of the new electronic book 114 with the metadata of such single-version books.

Note that the comparisons of FIG. 2 might in some embodiments be effectively performed or supplemented by means of database queries. Given a book title and author name, for example, the ingestion service 110 might query a content database for other books having similar or identical titles and author names.

FIG. 3 illustrates an example of how the second-pass content comparison 212 might be performed. The second-pass comparison 212 is performed if the results of the first-pass comparison of FIG. 2 results in ambiguity, such as identifying more than a single title set to which the electronic book 114 may belong. Other types of ambiguities may also arise, such as partial metadata matches, that might trigger the second-pass comparison 212.

The second-pass comparison 212 includes iterating the steps within the dashed block of FIG. 3 for each of the candidate title sets identified in the first pass comparison, which are indicated by reference numeral 302 in FIG. 3.

For each one of the candidate title sets 302, an action 304 is performed, which comprises comparing the text of the electronic book 114 and the candidate title set 302 to calculate a text matching score indicating similarity between the text of the received electronic book 114 and that of the member book 302.

In some embodiments, the comparison 304 may be limited to comparison against a single member of each title set, or against a canonical version of a book that represents the title set. Also, note that some title sets may contain only a single book.

The text comparison 304 may be performed in various ways. For example, a word comparison or word frequency comparison may be performed to determine whether certain words occur with the same or approximately the same frequency in both books. Alternatively, the edit distance between the two books may be calculated. Edit distance is a measure of the number of edits (insertions and deletions) that must be made in order to transform one text string to another. One type of edit distance is referred to as the Levenshtein distance. In some cases, edit distances may be calculated for portions or sections of a book, and those edit distances may be averaged or otherwise combined to determine similarity between two books.

Other alternatives for comparing text of the books may include evaluating the degree of word or page alignment. For example, autocorrelation techniques can be used to determine whether pages or other portions of one book occur in the text of another book. Techniques such as this are described in a US Patent Application entitled "Electronic Book Pagination," by inventors Jones and Berezhnyy, having Ser. No. 12/979,971, filed Dec. 28, 2010, which is hereby incorporated by reference. Other techniques for evaluating text alignment are disclosed in a US Provisional Application entitled "Aligning Content Items to Identify Differences", by inventors Hamaker and Killalea, having Ser. No. 61/427,682, filed Dec. 28, 2010, which is hereby incorporated by reference.

In many embodiments, the text comparison 304 is performed on the bodies or body texts of the two books being compared. The body text is the primary literary work or content of a book, excluding front matter and back matter such as tables of contents, forwards, title pages, afterwards, appendices, indexes, etc. Furthermore, the text may be normalized prior to comparison, by removing illustrations, extraneous characters, and by converting all characters to upper case or lower case.

At 306, if the text comparison 304 produces a text matching score higher than a pre-determined text threshold, the electronic book 114 is grouped at 308 with the book that was the object of the comparison, and becomes part of the same title set. Otherwise, if the text comparison 304 produces a text matching score that is not higher than the text threshold, the actions are repeated as indicated by 310. The actions within block 300 are repeated for all of the candidate titles sets 302.

Note that the description above assumes that matching scores and thresholds are numerical and that greater scores indicate higher degrees of similarity. Different implementations may of course use different types of measurements and thresholds to indicate similarity.

Figure 4:
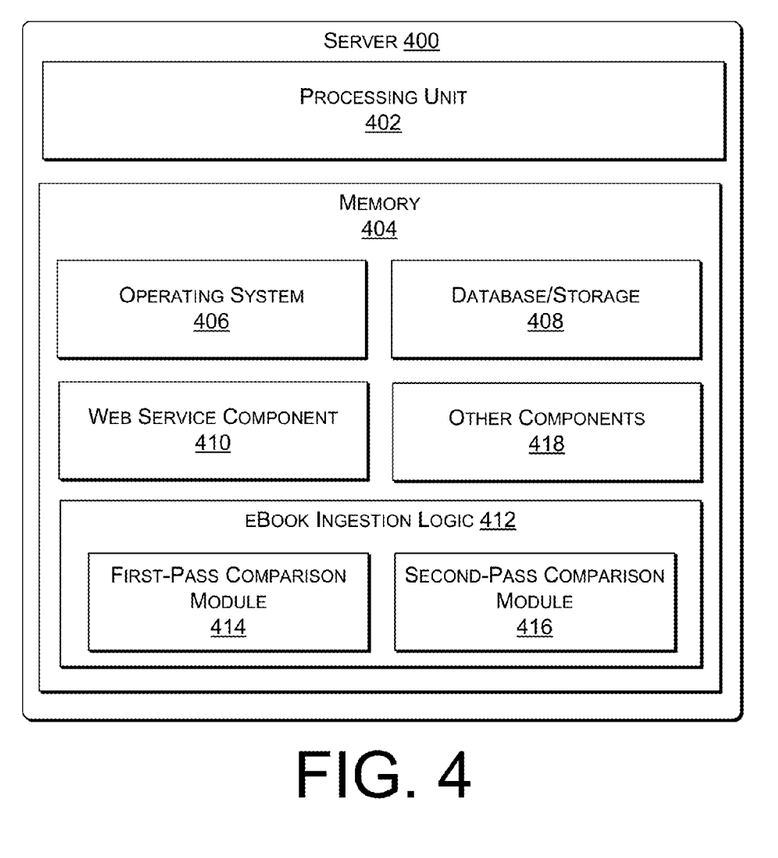
FIG. 4 is a block diagram illustrating components of a server that may be used to implement some of the techniques described herein.

FIG. 4 illustrates relevant components of a server 400 that may be used to implement the functionality of the content service 108 and/or its various components such as the ingestion service 110. Generally, these services may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 400 may comprise a processing unit 402 composed of one or more processors, and memory 404. Depending on the configuration of the server 400, the memory 404 may be a type of computer storage media and may include volatile and non-volatile memory. Thus, the memory 404 may include, but is not limited to, RAM, ROM, EEPROM, flash memory, or other memory technology.

The memory 404 may be used to store any number of functional components that are executable by the processing unit 402. In many embodiments, these functional components comprise instructions or programs that are executable by the processing unit 402, and that when executed implement operational logic for performing the actions attributed above to the content service 108 and the ingestion service 110. In addition, the memory 404 may store various types of data that are referenced by executable programs, including content items that are supplied to consuming devices such as electronic reader 104.

Functional components stored in the memory 404 may include an operating system 406 and a database 408 to store content items, annotations, title set data, eBook metadata, etc. Functional components of the server 400 may also comprise a web service component 410 that interacts with remote devices such as computers and media consumption devices.

The memory 404 may also include eBook ingestion logic 412, configured to implement the functionality described above with reference to FIGS. 2 and 3. The eBook ingestion logic 412 may include a first-pass comparison module 414 that performs the actions shown in FIG. 2. The eBook ingestion logic 412 may also include a second-pass comparison module 416 that performs the actions shown in FIG. 3.

The server 400 may of course include many other logical, programmatic, and physical components, generally referenced by numeral 418.

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A computer-implemented method, comprising:
   under control of one or more processors configured with executable instructions,
   receiving, from a device of an author and via a content ingestion service associated with a network, an electronic book having first body text and first metadata;
   normalizing the electronic book by removing illustrations from the electronic book, removing extraneous characters from the electronic book, and converting characters of the electronic book to a single case;
   determining, in response to the normalizing of the electronic book, whether the first metadata of the electronic book matches metadata of any existing book title sets;
   based at least partly on a first determination that the first metadata of the electronic book matches second metadata of no more than a single existing book title set that includes at least one book, adding the electronic book to the single existing book title set such that the single existing book title set includes the at least one book and the electronic book;
   based at least partly on a second determination that the first metadata of the electronic book matches third metadata of multiple existing book title sets, calculating a text matching score corresponding to individual ones of the existing book title sets, the text matching score indicating a comparison of a first frequency of one or more words included in the first body text of the electronic book and a second frequency of the one or more words included in second body text of the corresponding existing book title set; and
   adding the electronic book to an existing book title set of the multiple existing book title sets based at least partly on the text matching score corresponding to the existing book title set being greater than a specified threshold, the existing book title set including the electronic book and one or more other books.

2. The computer-implemented method of claim 1, wherein the first metadata of the electronic book and the metadata of the existing book title sets indicates one or more of:
   title;
   authorship;
   publisher;
   publication date;
   copyright date; and
   International Standard Book Number (ISBN).

3. The computer-implemented method of claim 1, wherein calculating the text matching score comprises evaluating word alignment between the electronic book and the existing book title set.

4. The computer-implemented method of claim 1, wherein calculating the text matching score comprises evaluating page alignment between the electronic book and the existing book title set.

5. The computer-implemented method of claim 1, wherein calculating the text matching score comprises evaluating word frequencies of the electronic book and the existing book title set.

6. The computer-implemented method of claim 1, wherein calculating the text matching score comprises evaluating edit distances between the electronic book and the existing book title set.

7. A computer-implemented method, comprising:
   under control of one or more processors configured with executable instructions,
   receiving, from a device of an author and via a content ingestion service associated with a network, an electronic book having first body text and first metadata;
   normalizing the electronic book by at least one of removing illustrations from the electronic book, removing extraneous characters from the electronic book, or converting characters of the electronic book to a single case;
   comparing the first metadata of the electronic book with second metadata corresponding to other books to identify one or more candidate title sets of which the electronic book may be a member;
   determining that a number of the one or more candidate title sets meets or exceeds a pre-determined number of candidate title sets; and
   based at least partly on the determining that the number of the one or more candidate title sets meets or exceeds the pre-determined number of candidate title sets, comparing the first body text of the electronic book with second body text of the one or more candidate title sets to determine that the electronic book is a member of the one or more candidate title sets.

8. The computer-implemented method of claim 7, wherein the second body text of the one or more candidate title sets comprises a canonical text corresponding to the one or more candidate title sets.

9. The computer-implemented method of claim 7, wherein the second body text of the one or more candidate title sets comprises body text of an existing member of the one or more candidate title sets.

10. The computer-implemented method of claim 7, wherein the first metadata of the electronic book and the second metadata corresponding to the other books comprises multiple data fields.

11. The computer-implemented method of claim 7, wherein the first metadata of the electronic book and the second metadata corresponding to the other books comprises at least an author field and a title field.

12. The computer-implemented method of claim 7, wherein:
the first metadata of the electronic book comprises a first author field and the second metadata corresponding to the other books comprises a second author field; and
comparing the first metadata comprises determining whether there is common authorship between the electronic book and the other books based on the first author field and the second author field.

13. The computer-implemented method of claim 7, wherein:
the first metadata of the electronic book and the second metadata corresponding to the other electronic books indicate respective titles of the electronic book and the other electronic books; and
the method further comprising normalizing the first metadata prior to comparing the first metadata.

14. The computer-implemented method of claim 7, wherein comparing the first metadata comprises calculating metadata similarity scores based at least in part on similarity between the first metadata of the electronic book and the second metadata corresponding to the other electronic books.

15. The computer-implemented method of claim 7, wherein comparing the first body text comprises evaluating word alignment between the electronic book and the one or more candidate title sets.

16. The computer-implemented method of claim 7, wherein comparing the first body text comprises evaluating page alignment between the electronic book and the one or more candidate title sets.

17. The computer-implemented method of claim 7, wherein comparing the first body text comprises evaluating word frequencies of the electronic book and the one or more candidate title sets.

18. The computer-implemented method of claim 7, wherein comparing the first body text comprises evaluating edit distances between the first body text of the electronic book and the second body text of the one or more candidate title sets.

19. An online electronic book service, comprising:
one or more processors; and
one or more non-transitory computer-readable storage media containing instructions that are executable by the one or more processors to perform actions comprising:
receiving, from a device of an author and via a content ingestion service associated with a network, an electronic book;
normalizing the electronic book by at least one of removing illustrations from the electronic book, removing extraneous characters from the electronic book, or converting characters of the electronic book to a single case;
performing a first-pass comparison of metadata of the electronic book with metadata of different book title sets to identify one or more candidate title sets of which the electronic book may be a member; and
based at least partly on a determination that the first-pass comparison identifies a partial match for multiple candidate title sets, performing a second-pass comparison of first body text of the electronic book with second body text of the multiple candidate title sets to determine that the electronic book is a member of any of the multiple candidate title sets.

20. The online electronic book service of claim 19, wherein the second-pass comparison comprises comparing word frequencies of the electronic book and the multiple candidate title sets.

21. The online electronic book service of claim 19, wherein the second-pass comparison comprises comparing word alignment of the electronic book with the multiple candidate title sets.

22. The online electronic book service of claim 19, wherein the second-pass comparison comprises comparing page alignment of the electronic book with the multiple candidate title sets.

23. The online electronic book service of claim 19, wherein the second-pass comparison comprises comparing edit distances between the electronic book and the multiple candidate title sets.

24. The online electronic book service of claim 19, wherein the actions further comprise, based at least partly on a determination that the first-pass comparison does not identify any candidate title sets of the multiple candidate title sets, performing the first-pass comparison with respect to a different electronic book.

* * * * *